United States Patent [19]

Rembold

[11] Patent Number: 4,626,143

[45] Date of Patent: Dec. 2, 1986

[54] SPOT FACER AND BORING HEAD HAVING REPLACEABLE CARBIDE CUTTERS

[75] Inventor: David C. Rembold, Bloomington, Minn.

[73] Assignee: Sunnen Products Company, St. Louis, Mo.

[21] Appl. No.: 617,672

[22] Filed: Jun. 6, 1984

[51] Int. Cl.⁴ ............................................. B23C 1/20
[52] U.S. Cl. ..................................... 408/82; 408/196; 408/201
[58] Field of Search .......... 408/232, 233, 238, 239 R, 408/241 R, 195, 196, 198, 82

[56] References Cited

U.S. PATENT DOCUMENTS

| | | |
|---|---|---|
| 867,275 | 10/1907 | Hunter . |
| 1,074,820 | 10/1913 | Schellenpach . |
| 1,448,273 | 3/1923 | Kelly . |
| 1,474,369 | 11/1923 | Johnson et al. . |
| 1,484,207 | 2/1924 | Campbell . |
| 1,668,351 | 5/1928 | Black ................................. 408/232 |
| 1,688,558 | 10/1928 | Severson ........................... 408/198 |
| 1,791,205 | 2/1931 | Hartwell . |
| 1,822,689 | 10/1932 | Albertson ............................ 408/82 |
| 1,960,319 | 5/1934 | Severson . |
| 2,092,984 | 9/1937 | Muth . |
| 2,128,571 | 8/1938 | Miller . |
| 2,712,686 | 7/1955 | Heldt . |
| 3,591,305 | 7/1971 | Aichhorn ............................ 408/161 |
| 3,711,216 | 1/1973 | Zurcher .............................. 408/153 |
| 3,791,429 | 2/1974 | Morris ................................. 144/218 |
| 3,798,724 | 3/1974 | Czopor . |
| 4,178,115 | 12/1979 | Pool .................................. 408/196 X |

Primary Examiner—Z. R. Bilinsky
Attorney, Agent, or Firm—Haverstock, Garrett & Roberts

[57] ABSTRACT

A rotating cutting tool has a clamping system that positively locks generally square or rectangular carbide cutters into position on the cutter head and extending outwardly from the head for spot facing or boring as the head is rotated. The head has backing supports that are raised above the head end surface for backing and securely holding the carbide inserts to prevent breakage or damage. The clamping system is very rapidly used, and particularly in the case of a spot facer, by having a proper diameter pilot pin member in the center, the carbide cutter inserts can be quickly adjusted for the desired cutting diameter. The unit has no flutes as normally required for high speed or sweated carbide spot facers.

13 Claims, 4 Drawing Figures

SPOT FACER AND BORING HEAD HAVING REPLACEABLE CARBIDE CUTTERS

BACKGROUND OF THE INVENTION

1. Field of the Invention

The present invention relates to rotating holders and carbide cutters used thereon.

2. Description of the Prior Art

Various carbide cutter blades have been utilized in the past, but generally speaking spot facers and boring heads have had carbide bits "sweated" or in some way solidly affixed to the cutter face in a permanent manner, so that the cutter blades are not replaceable. Replaceable cutter blades have been utilized in various types of cutters, and for example U.S. Pat. No. 1,960,319 shows an expansion reamer which has blades that extend radially out from the reamer head. These blades are held in place with tapered head screws that clamp the sides of slots down against the reamer blades.

U.S. Pat. No. 1,791,205 also shows an expansion type reamer that had radially extending blades, which are held in slots through the use of a ring that will expand when a tapered head screw is tightened down into a split in the ring.

U.S. Pat. No. 1,688,558 shows the use of tapered screws to adjust the diameter of a hollow mill, and U.S. Pat. No. 2,092,984 shows the use of a tapered screw head to tighten cutter elements into position for use as well.

Another locking arrangement for cutter blade inserts is shown in U.S. Pat. No. 3,798,724 where again radially extending blades are latched in place through a tooth arrangement. A locking screw is utilized to keep the blades engaged in position.

U.S. Pat. No. 3,711,216 shows a tool bit adjusting device that includes cutter blades that are made of carbide material, and have three sides (they are triangular) each of which can form a cutting edge, and which are held in place with a tightening screw and wedge. In this case the wedge has a groove that engages a portion of the screw head so that as the screw is tightened in, the wedge is pulled into position.

U.S. Pat. No. 1,484,207 illustrates an adjustable cylinder reamer that has a central tapered screw and can be tightened to position to radially adjust cutter blades, and the cutter blades extend out from the cylindrical sides of the head. Adjustable reamers are shown generally as well in U.S. Pat. Nos. 1,474,369; 1,448,273; and 1,074,820.

U.S. Pat. No. 3,591,305 illustrates a reamer that has a replaceable cutting blade that protrudes to one side only, and it is adjustable using a clamping screw arrangement. The amount of protrusion of the blade is also controlled by a wedge shaped member driven by a screw.

U.S. Pat. No. 2,712,686 illustrates an adjustable cutting tool construction having a central screw that adjusts the radial extension of angled blades, that is blades which extend radially outwardly but at an angle with respect to a radial plane.

A cutter which has replaceable blades held in place with a threaded wedge type screw or locking members is shown in U.S. Pat. No. 2,128,571, and a milling saw having two teeth that can be inserted and adjusted as to protrusion by threaded members is shown in U.S. Pat. No. 867,275.

U.S. Pat. No. 3,791,429 shows a rotary cutter which again includes radially extending blades that can be clamped in place and which are replaceable.

The above prior art does show central members that determine the diameter of the cutting blade, and adjusting the size of reamers by using tapered head screws that will control the diameter of the cut as shown. Use of a spot facer or boring head that has a cutting blade that can be inserted into a slot in the head against a pilot member, so that the blade extends outwardly from the head of the cutter, and which are easily replaced, securely held, and backed with gussets or backing lips or flanges are not shown in the prior art.

SUMMARY OF THE INVENTION

The present invention relates to rotary cutters which have cutting blades protruding from a cutter head, to provide cutting surfaces for spot facing or boring. The cutters have cutting edges on the ends and on the sides so that in the preferred spot facing form of the invention the spot face and the edges of the spot face are cleaned up precisely. The carbide blades have two sharpened sides.

In the spot facer embodiment shown the cutter head includes an opening for a pilot pin, and the cutter blades can easily be slid into provided slots with the inner edges of the cutter blades abutting against the pilot pin. The cutter blades are tightened in position by using taper head screws that bend narrow wall portions of the cutter head against the blades, so that the blades are forced against backing surfaces.

There are gussets or backing lips on the head to provide support for the cutter blades along a substantial portion of their exposed length so that there is not a tendency to break the blades as they are used.

Replacement is very quick, and because the surfaces of the groove and the outer surface of the pilot pin are clearly defined, adjustment is not any problem. The grooves for holding the blades are provided with small relief sections to insure that there are not any pieces of dirt or the like that will jam the bit as it is being put into place.

DETAILED DESCRIPTION OF THE PREFERRED EMBODIMENTS

Figure 1:
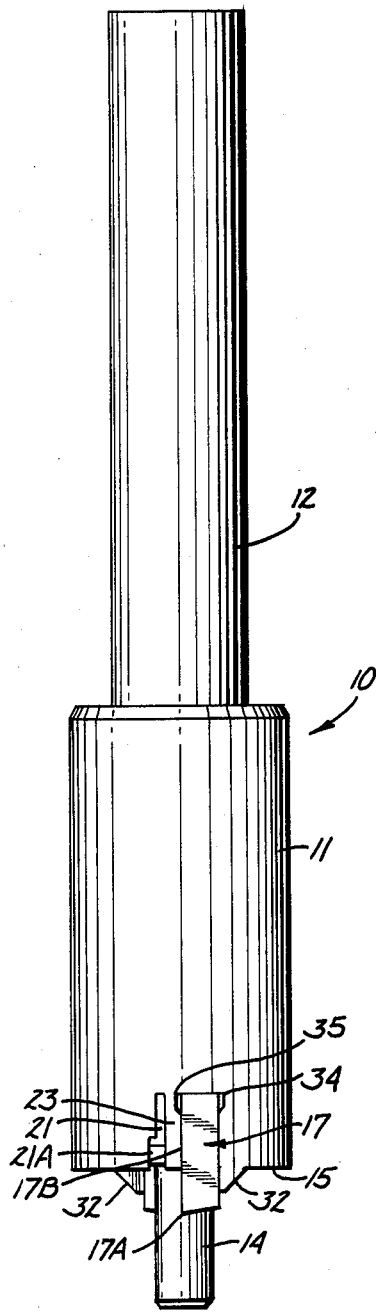
FIG. 1 is a side elevational view of a cutter head having carbide blades and being made according to the present invention.

A spot facer indicated generally at 10 includes a drive head 11, and a drive shank 12 that is mounted in a suitable driving tool to rotate the head.

The head 11 has a central opening that is precisely bored, and into which a pilot pin 14 is inserted. The pilot pin 14 is of precise diameter and can be used for piloting the spot facer or cutter in a central bore around which a spot face is to be made. The preferred form of the invention shown is a spot facer, but the head and cutter blades may comprise a boring head, if desired.

The head 11 has an end surface indicated generally at 15, and the head is provided with a pair of blade pockets or slots shown at 16, 16 into which carbide cutter bits or blades 17 may be inserted. The blade pockets are defined to closely receive the carbide cutter blades 17. As can be seen, each carbide cutter blade is a flat piece of carbide steel that has a pair of sharpened cutting edges on two edges at 90° to each other, and these edges are shown at 17A and 17B. 17A is the edge facing in the direction of feed of the spot facer and extending radially. Edge 17B is parallel to the longitudinal axis and forms a cutting edge that defines the outer edge surface of the spot face. The edge 17B would be the cutting edge when the device of the invention is used as a boring head.

As can be seen, the inner edge surfaces of each of the blade pockets 16 lies along a diametral plane indicated generally at 20 and the opposite sides of the pockets are spaced outwardly from this plane 20 (see FIG. 2) so that the carbide cutter blades have their cutting edges 17B lying on this plane 20. The inner corners of the carbide blades 17C, where they abut the pilot pin 14, are square with the side surfaces of the blade. Surface 17D will then seat tangent to this pin 14 to control the cutter diameter.

A first transverse slit 21 is provided adjacent one of the pockets 16, and spaced therefrom, and a second slit 22 is provided adjacent the second pocket. The slits 21 and 22, as shown, intersect the bore 16 for the pilot pin 14 and extend out to the outer surface of the cutter head, and each slit defines a bendable, resilient clamping wall 23 between each pocket 16 and the respective slit. Separate recesses 21A and 22A are provided on the side of the respective slit spaced from the wall so the slits have a greater width at the upper portion. The clamping walls are relatively narrow in transverse dimension, and drilled and tapped openings 24 are provided just slightly off center from the center of each of the slits but, as shown substantially centered on the width of the combined slit and recess at the outer end of the slit. The drilled and tapped openings receive threaded shanks of tapered head screws 25. The upper ends of the threaded opening 24 provides a guide bore 26 that receives the shank portion of the screw, and a conical interior counterbore 27 at the upper end (partially on the bendable walls) opens to the surface 15. Conical heads 30 of the tightening screws 25 fit the counterbores 27. The screws 25 can be tightened down, and as they are rotated the heads 30 bear against the conical surfaces 27 and tend to bend the wall portions 23 in toward the respective cutting blade 17 and force the respective cutting blade against the opposite side of the associated pocket 16 that is formed. The recesses 21A and 22A reduce the surface area of the counterbore so friction is less and for a given torque on the screw, a greater clamping pressure is provided.

Figure 2:
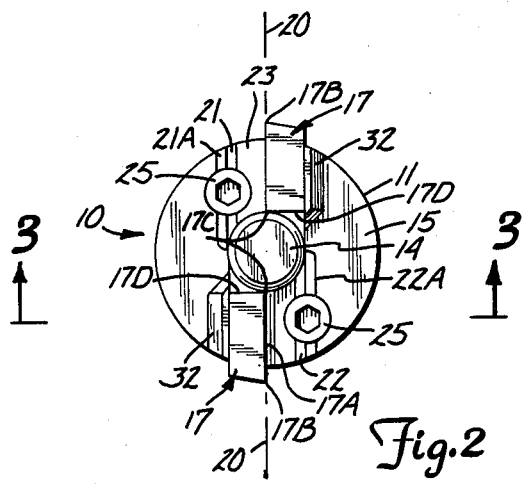
FIG. 2 is an end elevational view of the cutter head of FIG. 1.
Figure 3:
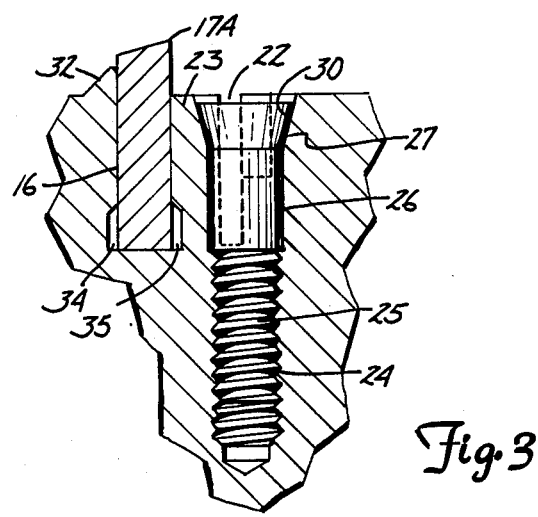
FIG. 3 is a fragmentary sectional view taken as on line 3—3 in FIG. 2.
Figure 4:
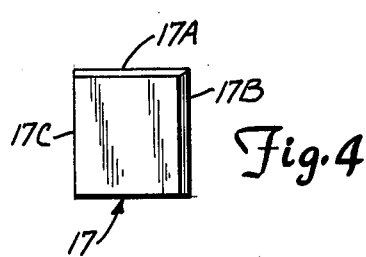
FIG. 4 is a front view of a carbide cutter blade used with the cutter head of the present invention.

A backing gusset or lip member 32 is provided in line with the opposite (outer) side surface of each of pockets 16 from the walls 23. The backing gussets 32 extend outwardly from the face surface a substantial portion of the axial extension of the cutting blades 17 from the face surface. The gussets back the cutter blades along substantially seventy five percent of the distance of protrusion of the blades from the face surface 15. These backing lips or gussets are tapered, and do not interfere with the operation of the cutter head, and yet provide a backing so that the pressures from cutting when the cutter head is rotated in the direction indicated by the arrow 33 in FIG. 2 are carried back to the cutter head without having a load which will break the carbide blades.

The walls 23 are kept relatively short, so that the cutter blades 17 are easy to insert, and can be clamped positively by tightening the screws 25 in the bores so that the tapered surfaces of counterbores 27 and the surfaces of heads 30 cause the tightening action.

It can be seen that the carbide blades can quickly be replaced by loosening the screw 25 so that the walls 23 spring back to their normal position and then the blades can be taken out of the pockets and new ones replaced. Strength is obtained by having the backing gussets 32, and the diameter of the spot face or the bore being cut is easily set by pushing the carbide blades against the pilot pin and then merely clamping them in place.

There are small relief grooves 34 and 35 on the bottom corners of the blade pockets, which aid in reducing stress of bending the wall 23, and also provide for a relief for particles of dirt or small chips to be received and not interfere with the positive seating of the cutter blades 17.

Again, while a spot facer has been shown, the use of replaceable carbide cutter blades in a boring head having the pockets and bendable wall for holding the cutters is also within the present invention.

Although the present invention has been described with reference to preferred embodiments, workers skilled in the art will recognize that changes may be made in form and detail without departing from the spirit and scope of the invention.

What is claimed is:

1. A rotatable boring tool comprising a head member and means to mount the head member to permit rotation thereof about a longitudinal axis, said head member having an outer peripheral surface and an end face surface generally perpendicular to said longitudinal axis comprising at least one groove defined in said head member having spaced parallel side walls and opening to the end face surface and to the peripheral surface, said groove having one side wall thereof lying in a radial plane, a slit in the head member adjacent to one side of said groove to form a relatively narrow and somewhat resilient wall between the groove and the slit, a longitudinally extending threaded bore formed in the head at a location intersecting the slit at an intermediate location, a cutter blade adapted to be inserted in said groove, and a screw-like member having a threaded portion for cooperating with the threaded bore and a tapered head portion, said tapered head portion being formed so that when the threaded member is turned into the threaded bore it exerts sideward pressure on the narrow resilient wall in a direction to clamp against the cutter blade in said groove.

2. The boring tool of claim 1 wherein there are two grooves on opposite sides of the head member, the radial extending side walls of the two grooves lying in the same plane.

3. The boring tool of claim 1 further including an axial bore and a pilot shank in said axial bore centered on and extending outwardly from said end face surface of said head member, said groove intersecting said axial bore whereby said cutter blade abuts against said pilot shank to locate the cutter blade when said blade is inserted in said groove.

4. The boring tool of claim 3 wherein said cutter blade is formed of a carbide material and has spaced opposed side faces and a peripheral wall extending therebetween, one edge of one of the side faces and the adjacent peripheral wall portion forming a cutting edge, the peripheral wall opposite said cutting edge tangentially abutting the pilot shank to establish the position of the cutting edge on a radial plane of the head member.

5. The boring tool of claim 1 wherein the head member has a portion that extends from the end face adjacent to one side of the groove.

6. A spot face cutter comprising a shank member having a longitudinal axis, and a head portion having a peripheral surface attached to the shank member adjacent to one end thereof, said shank member and said head portion adaptable to be rotated about the longitudinal axis, an end face surface on said head portion generally perpendicular to the longitudinal axis, a longitudinally extending bore extending into said head portion and centered on said longitudinal axis, a pilot member positioned in said bore and extending from the end thereof, a pair of longitudinally extending grooves formed in said head portion adjacent to the end face, each of said grooves extending between the bore and the peripheral surface of the head portion and being defined by opposed side surfaces parallel to the longitudinal axis, one of said opposed side surfaces of each of the grooves being coplanar and lying on a diametral plane of the head portion, the other of said opposed groove side surfaces being on opposite sides of the coplanar side surfaces, the grooves extending to the end face surface and to the peripheral surface of said head portion, a longitudinal slot formed in the head portion in spaced parallel relation to one side surface of each of said grooves to form a relatively narrow wall member between the respective slots and grooves, each of said wall members having a side surface forming one side surface of the respective groove, a threaded bore extending longitudinally into the head portion from the end face surface thereof through each of said slots at an intermediate location therealong, a cutter blade adapted to be inserted into each of said grooves, a threaded member having a threaded portion and a connected frusto-conical tapered head portion threadedly positioned in each of said threaded bores whereby when the threaded members are threaded into the respective bores the head portions thereof engage the respective relatively narrow wall members and cam the wall members toward the cutter blades positioned in the grooves to clamp the cutter blades into locked positions therein.

7. The spot face cutter of claim 6 wherein the end face surface of the head portion includes an endwardly extending portion thereof adjacent to corresponding sides of the respective grooves to provide additional support for the cutter blades positioned therein.

8. A boring head comprising a member adapted to be rotated about a longitudinal axis thereof, said rotatable member having a continuous side wall and an end face, an axial bore extending into said member from adjacent the end face, a pilot member positioned in said bore and extending from said end face, a groove for positioning a blade member therein having spaced side walls formed in the rotatable member and extending between the side wall and the axial bore therein, one side wall of said groove lying in a plane that passes through the axis of the member, a slot formed in the rotatable member in spaced relation to said groove on one side thereof, said slot and said groove forming a relatively narrow wall portion therebetween, a longitudinally extending threaded bore intersecting the slot at an intermediate location and extending into the member a predetermined distance, said bore having a frusto-conical end portion intersected by the slot adjacent a free end thereof and adjacent to the end face, a threaded member for threading into the threaded bore, said threaded member having a threaded portion for cooperating with the threaded bore and a head portion including a frusto-conical shaped portion with means therein for engagement by a tool used for turning the threaded member in the threaded bore, the frusto-conical shaped portion of the threaded member and the frusto-conical bore portion cooperating when the threaded member is threaded into the threaded bore to deflect the wall portion formed between the slot and the groove in a direction to reduce the width of the groove.

9. The boring head of claim 8 including a blade member having a thickness that is approximately the same as the space between the opposed surfaces of the groove so that is can be freely positioned in the groove when the wall portion is in an unstressed condition and is clamped and held in position therein when the threaded member is turned into the threaded bore to deflect the wall portion, said blade member extending from abutment with the pilot member on one side thereof to an opposite side extending beyond the continuous side wall.

10. The boring head of claim 8 including means formed integral with the end surface of the member adjacent one side of the groove to provide backing support for a blade member on one side thereof beyond the end face.

11. The boring head of claim 8 wherein similar grooves and adjacent slots are formed on diametrally opposite sides of the rotatable member and on opposite sides of the pilot member, one surface of each of said grooves lying in a common diametral plane passing through the axis of the rotatable member.

12. The boring head of claim 9 wherein the blade member has at least one cutting edge formed on the side thereof that is against the groove side wall that lies in the axial plane.

13. The boring head of claim 8 wherein the slot is spaced from the groove side wall that lies in the axial plane.

* * * * *